(12) United States Patent
Krauthamer et al.

(10) Patent No.: US 12,207,373 B2
(45) Date of Patent: Jan. 21, 2025

(54) ELECTRONIC POST FOR AMUSEMENT PARK SYSTEM

(71) Applicant: Universal City Studios LLC, Universal City, CA (US)

(72) Inventors: Akiva Meir Krauthamer, Ocoee, FL (US); Timothy Fitzgerald Garnier, Orlando, FL (US); Elam Kevin Hertzler, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 215 days.

(21) Appl. No.: 18/065,975

(22) Filed: Dec. 14, 2022

(65) Prior Publication Data
US 2024/0206040 A1 Jun. 20, 2024

(51) Int. Cl.
*H05B 47/175* (2020.01)
*H02J 50/10* (2016.01)
*H02J 50/40* (2016.01)
*H02J 50/80* (2016.01)
*H02J 50/90* (2016.01)
*G08B 7/00* (2006.01)

(52) U.S. Cl.
CPC ........... *H05B 47/175* (2020.01); *H02J 50/10* (2016.02); *H02J 50/40* (2016.02); *H02J 50/80* (2016.02); *H02J 50/90* (2016.02); *G08B 7/00* (2013.01)

(58) Field of Classification Search
CPC ..... H05B 47/175; H05B 47/115; H02J 50/10; H02J 50/40; H02J 50/80; H02J 50/90; H02J 50/20; H02J 50/001; G08B 7/00; G09F 23/00; G09F 27/005; H04L 67/125; H04L 67/52; A63G 31/00

USPC ......................................................... 315/291
See application file for complete search history.

(56) References Cited

U.S. PATENT DOCUMENTS

| 6,402,337 | B1 * | 6/2002 | LeVasseur | F21V 21/06 362/153.1 |
| 7,524,135 | B1 * | 4/2009 | Mirman | E01F 13/065 40/607.05 |
| 8,013,569 | B2 | 9/2011 | Hartman | |
| 8,121,667 | B2 | 2/2012 | Fisher et al. | |
| 10,847,959 | B1 * | 11/2020 | Usher | H01R 25/006 |
| 2018/0197410 | A1 | 7/2018 | Stafford et al. | |

(Continued)

FOREIGN PATENT DOCUMENTS

| CN | 203982698 U | 12/2014 |
| CN | 208503999 U | 2/2019 |

(Continued)

OTHER PUBLICATIONS

Displays2go, "13.3 Inch Digital Signage Stanchion w/ DiViEX Media Player App—Black," Apr. 26, 2022, pp. 1-8, https://www.displays2go.com/P-53290/Floor-Standing-Digital-Sign-Stanchion-Android-Operating-System-Built-In-Speakers.

(Continued)

*Primary Examiner* — Ryan Jager
(74) *Attorney, Agent, or Firm* — Fletcher Yoder, P.C.

(57) ABSTRACT

An amusement park system includes an electronic post configured to be positioned within a receptacle of a base of the amusement park system. The electronic post is configured to receive power directed to the receptacle. The amusement park system also includes a control system configured to determine a location of the electronic post and instruct operation based on the location.

20 Claims, 6 Drawing Sheets

(56) References Cited

U.S. PATENT DOCUMENTS

| | | | |
|---|---|---|---|
| 2018/0272540 A1* | 9/2018 | Cronin | A47L 1/00 |
| 2018/0286250 A1* | 10/2018 | Cronin | G05D 1/028 |
| 2024/0178642 A1* | 5/2024 | Beristany | H02G 3/081 |
| 2024/0206040 A1* | 6/2024 | Krauthamer | H05B 47/115 |

FOREIGN PATENT DOCUMENTS

| | | |
|---|---|---|
| CN | 110314357 B | 1/2021 |
| CN | 213989468 U | 8/2021 |

OTHER PUBLICATIONS

TrafficGuard, "Bollard Installation Instructions," Mar. 2, 2020, pp. 1-7, https://www.trafficguard.net/resources/installation-instructions.
PCT/US2023/083655 International Search Report and Written Opinion mailed May 2, 2024.

* cited by examiner

ELECTRONIC POST FOR AMUSEMENT PARK SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues may utilize various types of equipment to facilitate operations. For example, such equipment may include stanchions or posts that can be installed and removed. Specifically, for example, stanchions may be installed along amusement park roadways to manage foot traffic during a parade. As another example of equipment utilized to facilitate amusement park operations, power lines and data lines may be run throughout an amusement park to facilitate operation of electronics and other equipment. These power and/or data lines be installed and removed periodically to enable operations for certain attractions (e.g., a light show).

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, an amusement park system includes an electronic post configured to be positioned within a receptacle of a base of the amusement park system. The electronic post is configured to receive power directed to the receptacle. The amusement park system also includes a control system configured to determine a location of the electronic post and instruct operation based on the location.

In one embodiment, an amusement park system includes an electronic post configured to be positioned within a receptacle of a base of the amusement park system, an interface positioned within the receptacle and configured to receive power and to wirelessly transfer received power to the electronic post, and a control system configured to instruct adjustment of flow of the received power to the interface to adjust wireless transfer of the received power from the interface to the electronic post, thereby adjusting operation of the electronic post using the power.

In one embodiment, an electronic post for an amusement park system includes an extension configured to be positioned within a receptacle of a base of the amusement park system and a sensor configured to receive power wirelessly transferred from an interface disposed within the receptacle. The sensor is configured to transmit sensor data indicative of a parameter associated with the electronic post.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An amusement park may include various attraction systems, such as a ride (e.g., a roller coaster, a water ride, a drop tower), a performance show, a walkway, and so forth, with features that may entertain guests at the amusement park. The amusement park may also include various pieces of equipment to facilitate operation of the amusement park. For example, such equipment may include power storage (e.g., a battery), show effect devices (e.g., a light emitter), control system components (e.g., a sensor system), and the like.

Embodiments of the present disclosure are directed to an electronic post system to facilitate operations within the amusement park. The electronic post system may include individual or linked electronic posts (e.g., electronic stanchions, electronic columns, electronic pillars, electronic bollards, upright electronic supports, electronic beams, electronic poles) that incorporate or facilitate operational positioning of various types of equipment. For example, multiple components (e.g., pieces of equipment) may be coupled to and/or stored within a particular electronic post. Thus, the electronic post may facilitate organization and/or placement of such components. For instance, an electronic post incorporating a Wi-Fi access point may be moved or repositioned to different locations within the amusement park depending on need. Such repositioning may include utilizing various receptacles designed to support the electronic posts. These receptacles may include openings formed in a walkway, building, park area, or the like within the amusement park. Thus, the repositioning of an electronic post may include changing the receptacle in which the electronic post is positioned.

In certain situations, an electronic post may not meet performance expectations or may be improperly positioned for achieving a desired goal. For instance, equipment (e.g., wireless communication devices) associated with an electronic post (e.g., an electronic post including electronic components for signal boosting) that has been positioned in an undesirable location may not operate in an intended manner or provide an intended effect. As a specific example, a user (e.g., a technician, an operator, a guest) may move an electronic post to a location in which the electronic post is not intended to function and, as a result, certain operations of the amusement park may be negatively affected.

As such, it is presently recognized that confirmed positioning of electronic posts at desirable locations may facilitate operations associated with an amusement park, such as organization and/or operation of equipment utilized by the amusement park. Therefore, embodiments of the present disclosure are directed to monitoring respective locations of electronic posts and/or controlling operations of electronic posts based on their locations. As an example, a location of an electronic post may be determined and compared to a target location of the electronic post. The electronic post, or another component, may then be operated to guide positioning of the electronic post to the target location. As another example, a location of an electronic post may be mapped to a particular operation, and any electronic post in accordance with an embodiment of the present disclosure that is installed at that location may function in accordance with the particular operation, such as to output a light having a specific color. In any of such examples, power flow to an electronic post may be controlled to adjust operation of the electronic post. For instance, each electronic post may be insertable into a receptacle that communicatively couples with the electronic post upon insertion, and power flow to the receptacle may be enabled to provide power to the electronic post or interrupted to block powering of the electronic post. Adjusting power distribution to the electronic post may adjust operation of the electronic post and any dependent equipment, such as to enable operation of an electronic post positioned in a desirable location (e.g., a desired receptacle) or to suspend operation of an electronic post positioned in an incorrect location (e.g., an improper receptacle). In this way, positioning and/or operation of an electronic post, as well as of equipment associated with the electronic post, may be more desirably controlled and/or monitored. As such, overall operations of the amusement park devices that are powered by or otherwise utilize the electronic post system may be improved. Although the present disclosure is primarily directed to implementations in an amusement park, it should be noted that the techniques discussed herein may be implemented in any other suitable application in which electronic posts may be utilized.

Figure 1:
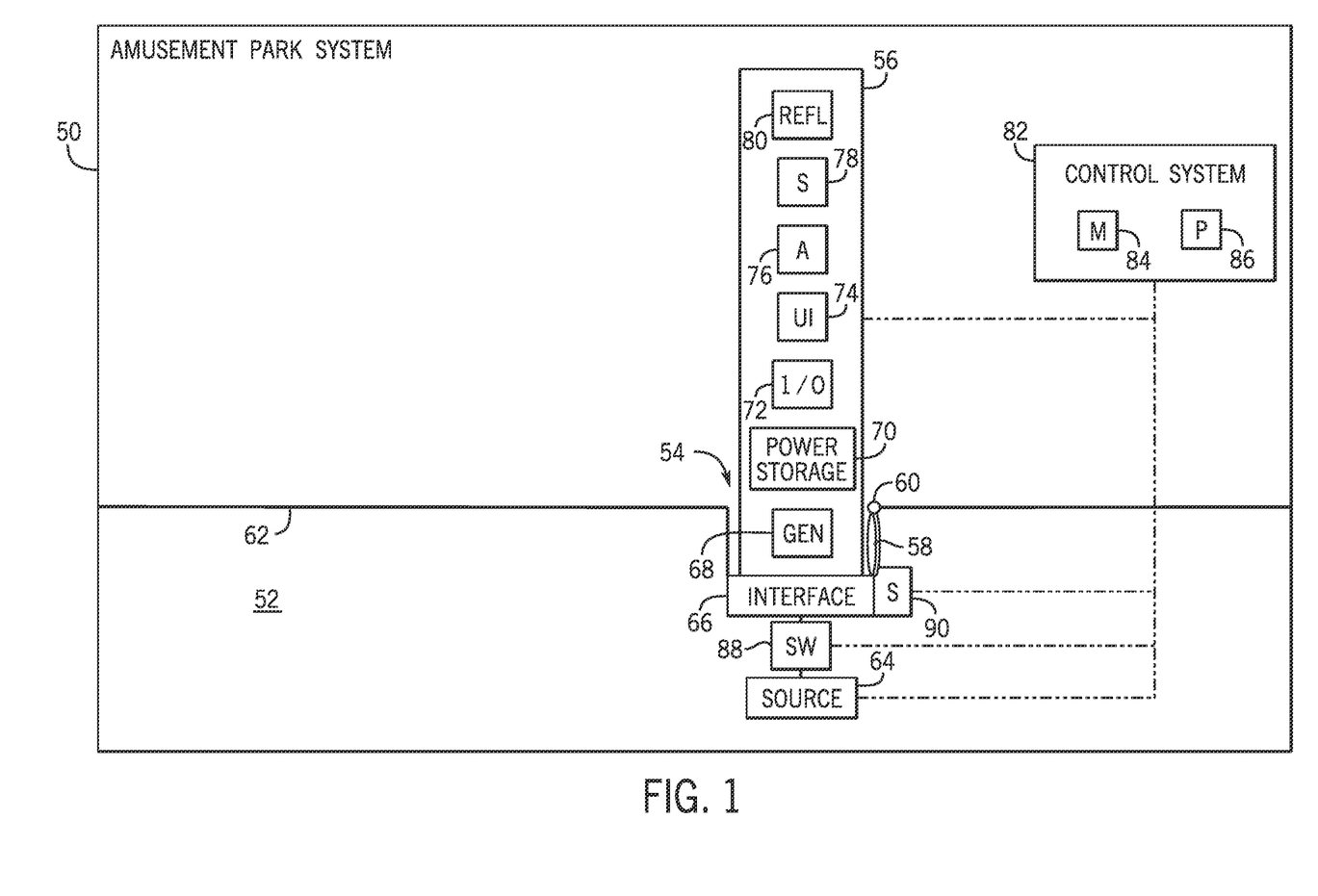
FIG. 1 is a schematic diagram of an embodiment of an amusement park system that includes an electronic post, in accordance with an aspect of the present disclosure.

With the preceding in mind, FIG. 1 is schematic diagram of an amusement park system 50. As an example, the amusement park system 50 may be a part of an attraction system, such as a ride (e.g., a roller coaster, a dark ride), a performance show, and the like. As another example, the amusement park system 50 may be a part of a dining venue, a waiting area, a walkway, a shopping venue (e.g., a gift shop), or any other suitable part of an amusement park. The amusement park system 50 may include what is herein be referred to as a base 52, which may include a floor (e.g., a pathway, the ground), a wall (e.g., a side wall), a ceiling, a stage, a fixed or movable support structure, and so forth. People (e.g., guests of the amusement park system 50) and/or different objects (e.g., vehicles, parade floats) may navigate along (e.g., on top of or adjacent to) the base 52.

A receptacle 54 (e.g., one receptacle of a plurality of similar receptacles) may be formed in the base 52, and an electronic post 56 of the amusement park system 50 may be insertable into the receptacle 54 (e.g., an opening of the receptacle 54). For example, engagement between the receptacle 54 and the electronic post 56 may be achieved by an interference fit, a sliding engagement, a threaded engagement (e.g., a screw-like structure), a spring lock fit, and the like. Such engagement may be facilitated by a tooled (e.g., keyed) or tool-less manipulation (e.g., provided by an operator or a technician). It may be beneficial to utilize a separate tool for such engagement and disengagement in order to resist unauthorized coupling or decoupling of the electronic post 56 and the receptacle 54.

The electronic post 56 may include a structure, such as a fixture or body, configured to extend out of the receptacle 54 (e.g., in an upright direction). Upon insertion of the electronic post 56 within the receptacle 54, the base 52 surrounding the receptacle 54 may capture the electronic post 56 to block movement of the electronic post 56, thereby securing the electronic post 56 within the receptacle 54. A lock, such as a mechanical lock (e.g., a mechanical lock integral with the electronic post 56, a mechanical lock integral with the base 52, a mechanical lock separate from the electronic post 56 and the base 52), may be used to secure the electronic post 56 within the receptacle 54 in an embodiment.

The electronic post 56 may be composed of any suitable material that provides sufficient rigidity and strength to maintain its position within the receptacle 54, as well as to maintain its structural integrity, such as during transportation and movement of the electronic post 56. The material of the electronic post 56 may also shield internal components of the electronic post 56 from external elements, such as precipitation, wind, dust, debris, an externally applied force, and so forth. For example, the electronic post 56 may be made of a metal, a composite material, a polymer, or any combination thereof. The material of the electronic post 56 or other visible aspect (e.g., color, decoration) of the electronic post 56 may be selected to enable the electronic post 56 to correspond to a surrounding environment, such as to a theme, to a background, or the appearance of adjacent objects.

In one embodiment, the base 52 may include a cover 58 that may be movable to transition between a first position (e.g., a blocking position) and a second position (e.g., a receiving position). In the first position, the cover 58 occludes the receptacle 54 while the electronic post 56 is not inserted within the receptacle 54. In the second position, the receptacle 54 is exposed to enable positioning of the electronic post 56 within the receptacle 54. As an example, the cover 58 may be configured to pivot about a hinge 60 to adjust between the first position and the second position. In the first position, the cover 58 may extend along (e.g., substantially parallel to) a surface 62 of the base 52. As such, the cover 58 may shield the receptacle 54, such as to block entry of debris (e.g., dirt) and other objects into the receptacle 54. In the second position, the cover 58 may extend crosswise to (e.g., substantially perpendicular to) the surface 62 in order to enable positioning of the electronic post 56 within the receptacle 54. In another embodiment, the cover 58 may extend out of a pocket or slot into the first position and slidingly retract into the pocket to transition to the second position. A biasing member may be configured to urge the cover 58 toward the first position (e.g., about the hinge 60 or out of the pocket) to occlude the receptacle 54. However, insertion of the electronic post 56 into the receptacle 54 (e.g., via a manually applied force) may adjust the cover 58 toward the second position that exposes the receptacle 54, and the electronic post 56 may block adjustment of the cover 58 to the second position while the electronic post 56 is positioned within the receptacle 54. In an embodiment, the cover 58 may be configured to lock in the first position and/or in the second position. As an example, a lock (e.g., a padlock) may secure the cover 58 in the first position, and a key may unlock the cover 58 from the first position to avoid undesirable unlocking of the cover 58 (e.g., by a guest instead of an operator). In another embodiment, the cover 58 may be a removable cap.

The electronic post 56 may provide multiple functions for the amusement park system 50. As an example, the electronic post 56 may serve as a physical barrier, such as to block people and/or other objects from traversing a portion of the base 52. As a specific example, cords, bars, netting, and so forth, may be strung between multiple electronic posts 56 to provide fencing or guide rails. Additionally or alternatively, the electronic post 56 may provide power (e.g., electric power, optical power) to certain devices or components that are electrically coupled to the electronic post 56. For example, the electronic post 56 may receive power from a power source 64 while positioned within the receptacle 54. In an embodiment, the power source 64 may provide power via wireless power transfer. For instance, the power source 64 may utilize inductive coupling in which the power source 64 produces a magnetic field, and the magnetic field produced by the power source 64 induces current flow through a coil of the electronic post 56 to provide power for the electronic post 56. By way of example, the power source 64 may deliver a current flow to an interface 66 to cause the magnetic field to be produced at the interface 66, and engagement between the electronic post 56 and the interface 66 may induce the current flow of the electronic post 56. Such a power transfer technique may not be substantially affected by presence of unwanted objects (e.g., debris, fluid) within the receptacle 54, thereby enabling the operation of the electronic post 56 and/or of the power source 64 to be maintained. The power source 64 may utilize a different technique for providing electronic power in an additional or alternative embodiment, such as another wireless power transfer technique (e.g., capacitive coupling, electrodynamic wireless power transfer, magnetodynamic coupling, Zenneck wave transmission, microwave power transmission, radio wave power transmission, laser power transmission) and/or a wired power transfer technique (e.g., power-over-fiber using a fiber optic cable).

The electronic post 56 may also include a power generator 68, which may be configured to produce power without interaction with the power source 64. As an example, the power generator 68 may harvest power from a surrounding environment, such as via solar energy, wind energy, light energy (e.g., light projected from an emitter positioned within the receptacle 54), a temperature differential (e.g., between the temperature above the surface 62 and a temperature below the surface 62), and so forth. The electronic post 56 may further include a power storage 70 (e.g., a battery), which may be configured to store power, such as initial power provided during manufacture of the power storage 70, power provided via the power source 64, power generated by the power generator 68, or any other suitable power. In this manner, the electronic post 56 may utilize power from multiple different components to operate.

As discussed herein, the electronic post 56 may be configured to couple to different equipment, such as to electronic devices or components. To this end, the electronic post 56 may include input/output (I/O) ports 72 that may enable the equipment to electrically couple to the electronic post 56. Such equipment may include a light emitter (e.g., a light bulb, a laser emitter, an infrared light emitter), a camera, a sensor (e.g., a location sensor, a proximity sensor, a light curtain sensor, an ambient light sensor, a temperature sensor, a humidity sensor, a moisture sensor, a wind sensor, a sound sensor, a deformation sensor), an audio output device, a communication hub or extender (e.g., for Wi-Fi, Bluetooth, 5G network), a point-of-sale terminal, a scanner (e.g., for facial recognition, quick response code, fingerprint), a display screen (e.g., a touch screen), a drink dispenser, a vending machine, a power distribution device (e.g., a power strip, a charger), a fan, a humidifier, a dehumidifier, a fluid (e.g., fog, mist, water) output device, a firework device, a projector, an animated figure, other suitable equipment, or any combination thereof. Such I/O ports 72 may enable increased flexibility to adjust arrangement of the equipment with respect to the electronic post 56. For instance, the I/O ports 72 may enable the equipment (e.g., equipment modules) to be interchangeably or removably coupled to the electronic post 56 based on a desired implementation and/or operation of the electronic post 56. In an additional or alternative embodiment, such equipment may be integral with (e.g., built into) the electronic post 56 and therefore may not be separately coupled to the electronic post 56 via the I/O ports 72. Thus, present embodiments may provide for a wide variety of options via modularity and/or consistency associated with integration. It should be noted that employed modules may be internally disposed within the electronic post 56 (e.g., not externally accessible). Indeed, the modules may be disposed within a housing of the electronic post 56 and may be inaccessible without a key, authentication code, or the like.

The electronic post 56 may further include other components that may or may not utilize power (e.g., wireless power received via the interface 66). For example, the electronic post 56 may include a user interface (UI) 74, such as a touch screen, a button, a dial, a switch, a trackpad, a mouse, or any other suitable component with which a user may interact. The electronic post 56 may also include an actuator 76, which may operate to cause operation, such as movement, of a portion of the electronic post 56. The electronic post 56 may also include a post sensor 78, such as any of the sensors described herein, configured to determine various parameters that may be used to operate the electronic post 56 or another component of the amusement park system 50. In an embodiment, the post sensor 78 may include a receiver that may be configured to receive data, such as data wirelessly transmitted toward the electronic post 56. Further still, the electronic post 56 may include a reflector 80 (e.g., a mirror, a retroreflector), which may reflect or deflect light directed thereon. As an example, the reflector 80 may provide greater visibility of the electronic post 56 to facilitate determining positioning of the electronic post 56, such as during low ambient light conditions. As another example, the reflector 80 may deflect light in a target direction to enable receipt of the light by a particular object, such as by another electronic post 56, to illuminate the particular object. In this way, the electronic post 56 may include multiple features to provide different possible functionalities.

The electronic post 56 may additionally include or be communicatively coupled to a control system 82 (e.g., an automation controller, a programmable controller, an electronic controller, a local controller, a central controller, control circuitry) configured to operate components of the amusement park system 50. The control system 82 may include a memory 84 and processing circuitry 86. The memory 84 may include volatile memory, such as random-access memory (RAM), and/or non-volatile memory, such as read-only memory (ROM), optical drives, hard disc drives, solid-state drives, or any other non-transitory computer-readable medium that includes instructions to operate the amusement park system 50. The processing circuitry 86 may be configured to execute such instructions. For example, the processing circuitry 86 may include one or more application specific integrated circuits (ASICs), one or more field programmable gate arrays (FPGAs), one or more general purpose processors, or any combination thereof.

The control system 82 may control a component of the electronic post 56. As an example, the control system 82 may control operation of the power generator 68, the power storage 70, the UI 74, and/or the actuator 76. As another example, the control system 82 may control power distribution to the electronic post 56. For instance, the control system 82 may control operation of the power source 64 to enable or block power transmission toward the electronic post 56 (e.g., to the interface 66). Additionally or alternatively, the control system 82 may operate a switch 88 to enable or interrupt power being transmitted from the power source 64 toward the electronic post 56 (e.g., to the interface 66). As a further example, the control system 82 may transmit data to the electronic post 56, which may receive the transmitted data (e.g., via the post sensor 78). For instance, the control system 82 may transmit data using a wireless technique (e.g., via the interface 66, which may include a transmitter configured to transmit the data) and/or a wired technique (e.g., via a fiber optic cable that may additionally transmit power) to the electronic post 56. Further still, the control system 82 may control locking of the electronic post 56 within the receptacle 54. As an example, the control system 82 may operate a smart lock (e.g., a smart lock integral to the electronic post 56, a smart lock integral to the base 52, a smart lock separate from the electronic post 56 and the base 52) to lock positioning of the electronic post 56 within the receptacle 54 and/or to unlock postponing of the electronic post 56 from the receptacle 54. In this manner, operation of the control system 82 may enable or block removal (e.g., by a manually applied force) of the electronic post 56 from the receptacle 54.

As discussed herein, it may be desirable to operate the electronic post 56 based on the different parameters. For example, operation of the electronic post 56 based on location may enable the electronic post 56 to provide more desirable functionalities, such as to provide show effects at a particular location within the amusement park system 50. To this end, the control system 82 may determine a parameter indicative of the location of the electronic post 56. For instance, the control system 82 may receive sensor data (e.g., Global Positioning System (GPS) data) from the post sensor 78 and determine the parameter based on the sensor data. The control system 82 may additionally or alternatively operate the electronic post 56 based on an identifier of the electronic post 56. The identifier may be determined via an interface sensor 90, which may determine sensor data indicative of the electronic post 56 in engagement with the interface 66 or otherwise positioned within the receptacle 54. The control system 82 may operate the electronic post 56 based on the received sensor data to adjust operations automatically (e.g., without receipt of a user input). In an additional or alternative embodiment, the control system 82 may operate the electronic post 56 based on a user input (e.g., received via the UI 74) to provide more interactive operations of the electronic post 56. In either case, the control system 82 may operate different electronic posts 56 in different manners to provide various functionalities.

Operation of the electronic post 56 may also adjust to provide different functionalities at different times. For instance, during a first interval of time, the control system 82 may operate the electronic post 56 to provide show effects, such as visual outputs and/or audio outputs. During a second interval of time, the control system 82 may operate the electronic post 56 as a point-of-sale terminal. As an example, the first interval of time may be during regular hours of operation of the amusement park system 50, and the electronic post 56 may operate to entertain any guest within the amusement park system 50. However, the second interval of time may include a time that is outside of the regular hours of operation of the amusement park system 50 during which access to at least a portion of the amusement park system 50 may be exclusive. For example, the amusement park system 50 may have an after-hours or before-opening event in which access may be permitted for an additional payment (e.g., via the electronic post 56). Thus, the operation of the electronic post 56 may be adjusted to provide multiple different operations that may be appropriate at different situations. In this way, the electronic post 56 may reduce costs associated with implementation of separate components and/or devices that may be dedicated to performing the respective operations.

Figure 2:
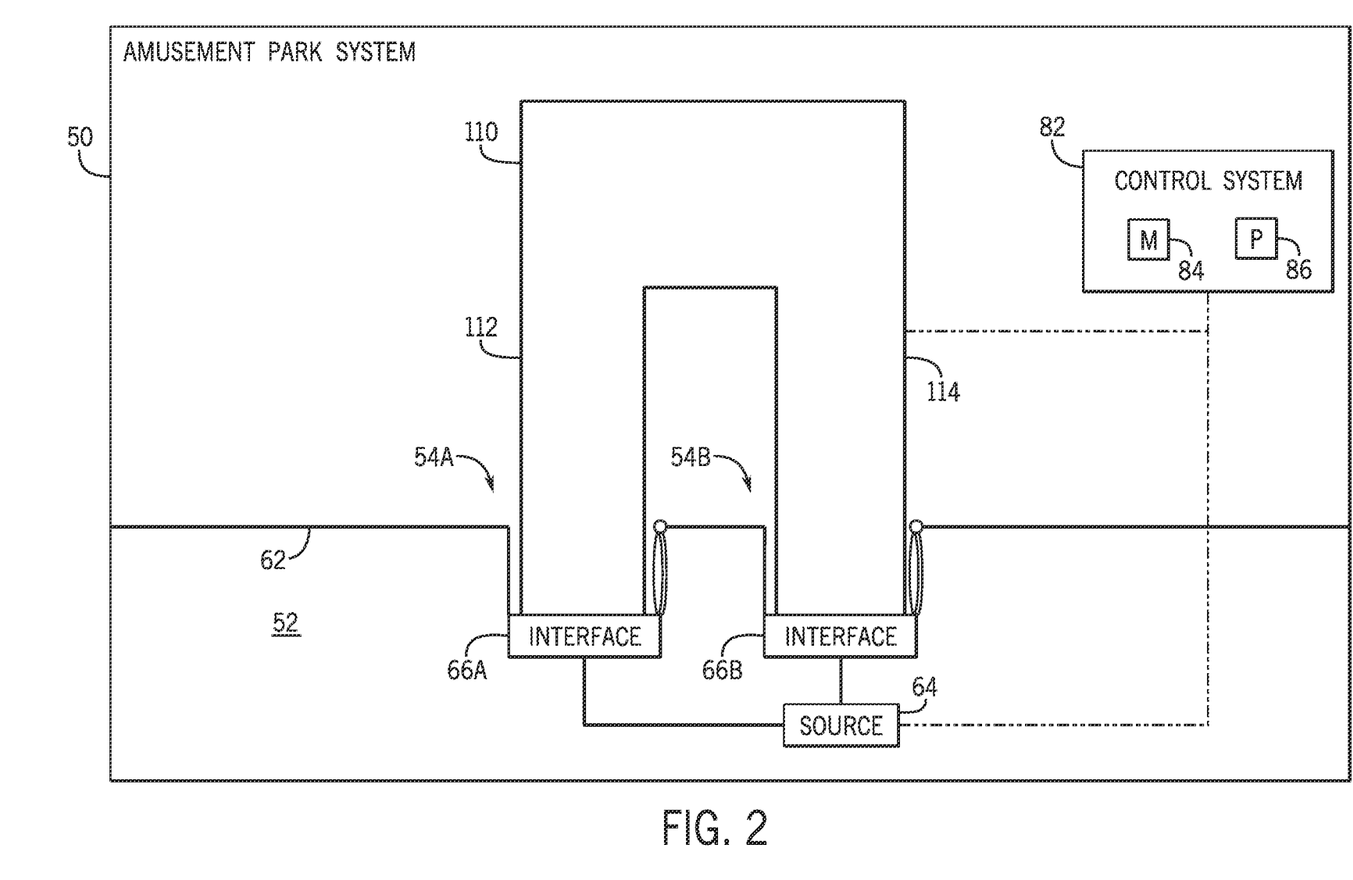
FIG. 2 is a schematic diagram of an embodiment of an amusement park system that includes an electronic post, in accordance with an aspect of the present disclosure.

FIG. 2 is a schematic diagram of the amusement park system 50, which has an electronic post 110 that may be insertable into multiple receptacles 54. For example, the electronic post 110 may include a first extension 112 and a second extension 114. In the illustrated embodiment, the first extension 112 is inserted into a first receptacle 54A (e.g., for engagement with a first interface 66A of at least two interfaces 66), and the second extension 114 is inserted into a second receptacle 54B (e.g., for engagement with a second interface 66B of at least two interfaces 66). Additionally or alternatively, the first extension 112 may be inserted into the second receptacle 54B, and the second extension 114 may be inserted into the first receptacle 54A. In either case, power may be provided to each of the first extension 112 and the second extension 114. For example, the power source 64 may transmit power to the first extension 112 and to the second extension 114 via the first and second interfaces 66A and 66B, respectively. Moreover, the power provided to the electronic post 110 via the extensions 112, 114 may be used to power different components of the electronic post 110. In an embodiment, the usage of two extensions 112, 114 may provide more power to the electronic post 110 as compared to power being provided to an electronic post (e.g., the electronic post 56 of FIG. 1) having a single extension.

In an embodiment, the arrangement of the electronic post 110, such as connection between the first extension 112 and the second extension 114, may provide a geometry that further enhances functionality as a physical barrier. For instance, the electronic post 110 may have a gateway, arch, or bridged configuration that may occupy a greater physical footprint than that occupied by an electronic post having a single extension. In this manner, the layout of the electronic post 110 may further block people and/or other objects from traversing a portion of the base 52. Such arrangement of the electronic post 110 may also increase mechanical stability of the positioning of the electronic post 110. For example, positioning of the electronic post 110 in multiple receptacles 54 may block movement of the electronic post 110 in certain degrees of freedom (e.g., rotational degrees of freedom), thereby maintaining the positioning of the electronic post 110.

Further, components that need additional power may utilize multiple connections to the interfaces 66A and 66B to acquire additional power. It should be noted that an electronic post having any suitable number of extensions, such as three or more extensions, may be manufactured. Indeed, the number of extensions may be manufactured based on a desired amount of power to be used by the electronic post, such as to enable desirable implementation and operation of various electronic components. Additionally or alternatively, the electronic post may be manufactured to include a desirable geometry, such as to have a layout that blocks off a particular area of the base 52, and the electronic post may have a quantity of suitable extensions to enable desirable support and/or positioning of the electronic post (e.g., to maintain the position of the electronic post). In this way, the manufacture of the electronic post may further enable the electronic post to provide desirable functionalities.

Figure 3:
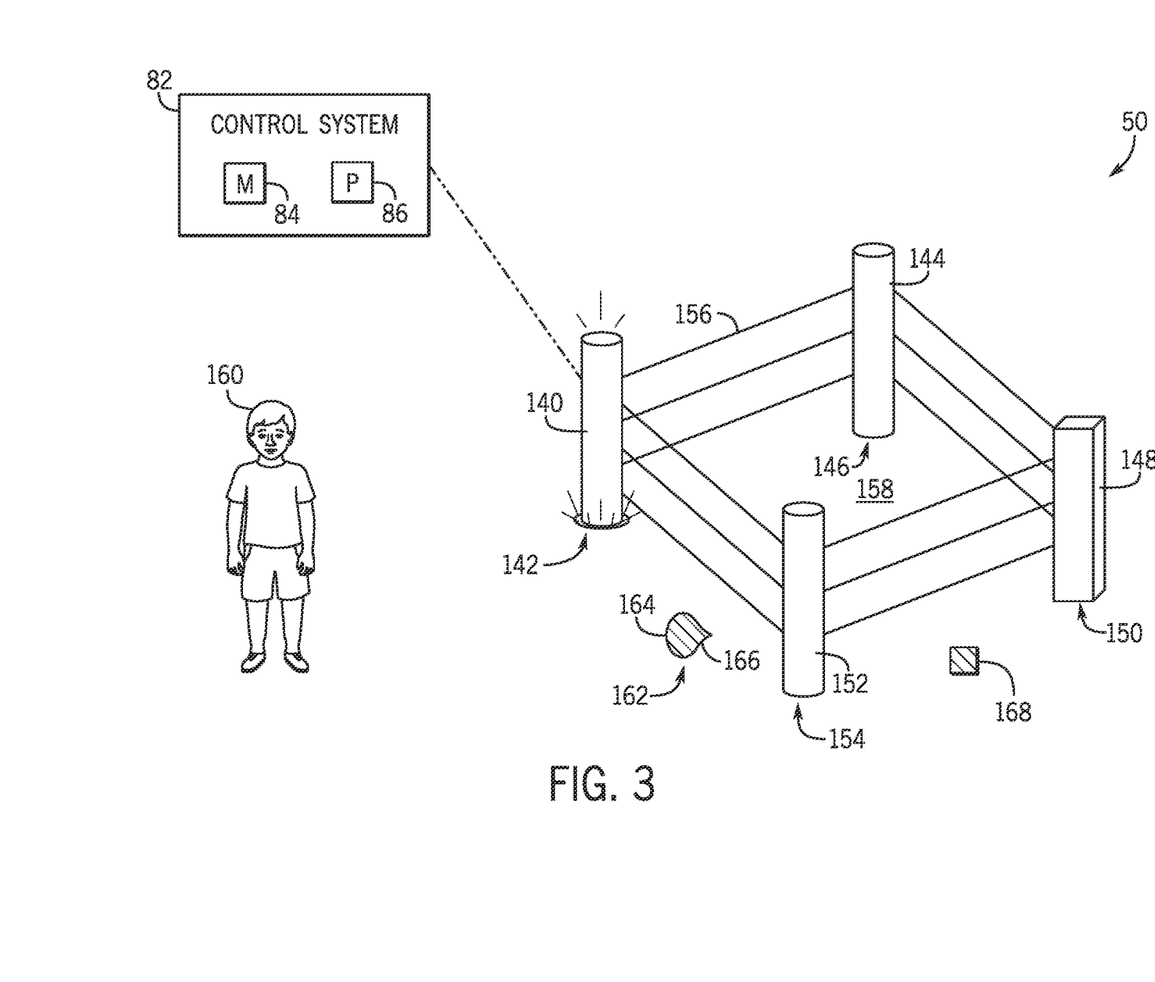
FIG. 3 is a perspective view of an embodiment of an amusement park system that includes electronic posts, in accordance with an aspect of the present disclosure.

FIG. 3 is a perspective view of the amusement park system 50 that includes electronic posts. For example, the amusement park system 50 may include a first electronic post 140, which may be inserted into a first receptacle 142, a second electronic post 144, which may be inserted into a second receptacle 146, a third electronic post 148, which may be inserted into a third receptacle 150, and a fourth electronic post 152, which may be inserted into a fourth receptacle 154. The electronic posts 140, 144, 148, 152 may cooperatively block an area of the amusement park system 50. By way of example, the electronic posts 140, 144, 148, 152 may emit light beams 156 (e.g., lasers) that surround (e.g., encloses) a space 158, thereby providing a light boundary around the space 158. In an embodiment, each of the electronic posts 140, 144, 148, 152 may be configured to emit a separate light beam 156. For instance, the first electronic post 140 may emit a first light beam toward the second electronic post 144, the second electronic post 144 may emit a second light beam toward the third electronic post 148, the third electronic post 148 may emit a third light beam toward the fourth electronic post 152, and the fourth electronic post 152 may emit a fourth light beam toward the first electronic post 140 to enclose the space 158. Additionally or alternatively, one of the electronic posts 140, 144, 148, 152 may direct the light beam 156 (e.g., deflect the light beam 156 via a reflector, enable passing of the light beam 156 through the electronic post) to cause the light beam 156 to span between multiple electronic posts 140, 144, 148, 152. For example, the first electronic post 140 may emit the light beam 156 toward the second electronic post 144. The second electronic post 144 may deflect the light beam 156 from the second electronic post 144 toward the third electronic post 148. In this manner, the light beam 156 emitted by the first electronic post 140 may span from the first electronic post 140, to the second electronic post 144, and to the third electronic post 148. Such an embodiment may reduce energy consumption associated with operation of the electronic posts 140, 144, 148, 152 to emit the light beam 156 that encloses the space 158. For instance, deflection of the light beam 156 to cause the light beam 156 to extend across multiple electronic posts 140, 144, 148, 152 may reduce a number of electronic posts 140, 144, 148, 152 that consume power to emit a separate light beam 156 that encloses the space 158.

Such operation of the electronic posts 140, 144, 148, 152 to provide the light boundary that encloses the space 158 via the light beams 156 may deter a user 160, such as a guest, from entering the space 158. In an embodiment, the control system 82 may be communicatively coupled to one or more of the electronic posts 140, 144, 148, 152 and may determine entry of the user 160 within the space 158. For example, the control system 82 may determine (e.g., via sensor data received from a sensor, such as a light curtain or a light detector, configured to determine receipt of light) interruption of the light beam 156 at any of the electronic posts 140, 144, 148, 152 to determine that the user 160, or any other object, has crossed the light boundary provided by the electronic posts 140, 144, 148, 152 and entered the space 158. In response, the control system 82 may output a notification to indicate that the user 160 is within the space 158, such as a visual output (e.g., another light emitted by one of the electronic posts 140, 144, 148, 152), an audio output (e.g., a sound), a communication provided to an electronic device (e.g., a mobile device) of a user, and the like.

The amusement park system 50 may also include features that facilitate desirable placement of the electronic posts 140, 144, 148, 152 (e.g., within desirable receptacles). As an example, the control system 82 may instruct that light having a particular color be projected out of a receptacle and instruct an electronic post to project a light having a corresponding color in response to determining the electronic post is to be positioned within the receptacle. For instance, the first receptacle 142 may include a light emitter (e.g., as a part of the interface 66 of FIG. 1) that projects a red light, and the first electronic post 140 may also project a red light to indicate that the first electronic post 140 is to be inserted to the first receptacle 142 that has a matching light. Thus, a user installing the first electronic post 140 may more easily determine that the first electronic post 140 is to be positioned within the first receptacle 142 instead of within other receptacles (e.g., the second receptacle 146, the third receptacle 150, the fourth receptacle 154) that may have projected light with colors that do not match the color of the light projected by the first electronic post 140.

As another example, the control system 82 may operate an electronic post to provide feedback that may indicate to a user whether the electronic post is positioned within a desirable receptacle. For instance, the control system 82 may be configured to determine a target electronic post (e.g., an electronic post having a particular function, such as including a communications module or a lighting module) to be positioned within a receptacle, determine an identifier of a current electronic post positioned within the receptacle (e.g., via the interface sensor 90 of FIG. 1), and determine whether the current electronic post matches the target electronic post. For example, the control system 82 may determine whether an inserted electronic post has light boundary functionality based on the location of the electronic post calling for a light boundary. In response to determining that the target electronic post and the current electronic post do not match one another, thereby indicating an undesirable electronic post may be positioned within the receptacle, the control system 82 may instruct the electronic post or another component to provide a notification (e.g., a visual output, an audio output, a communication transmitted to an electronic device) to indicate as such. Additionally or alternatively, in response to determining the target electronic post and the current electronic post match one another, thereby indicating a desirable electronic post may be positioned within the receptacle, the control system 82 may instruct another notification to be provided.

The control system 82 may similarly operate to instruct that an indication be provided as to whether an electronic post is to be removed from a receptacle and/or moved to a different receptacle. For example, the control system 82 may determine an electronic post positioned within a first receptacle is to be removed from the first receptacle. In response, the control system 82 may operate to instruct that light (e.g., respective lights that do not have matching colors) be projected by the electronic post and out of the first receptacle to indicate the electronic post is to be removed from the first receptacle. The control system 82 may then determine a second receptacle to which the electronic post is to be moved. The control system 82 may then operate to instruct that light (e.g., respective lights that have matching colors) be projected by the electronic post and out of the second receptacle to indicate the electronic post is to be positioned within the second receptacle. As such, the control system 82 may facilitate desirable adjustment of the positioning of the electronic post.

The receptacles and electronic posts may also be shaped to enable or block positioning of certain electronic posts within the receptacles. For example, the first electronic post 140 may have a circular cross-sectional geometry, and the first receptacle 142 may have a corresponding circular cross-sectional geometry to enable positioning of the first electronic post 140 within the first receptacle 142. However, the third receptacle 150 may have a rectangular cross-sectional geometry and may block positioning of the first electronic post 140 within the third receptacle 150. The third electronic post 148 may have a corresponding rectangular cross-sectional geometry that enables positioning of the third electronic post 148 within the third receptacle 150. In this way, the cross-sectional geometry of the receptacles may block positioning of electronic posts that do not have a corresponding cross-sectional geometry within such receptacles to facilitate positioning of a desirable electronic post (e.g., having a matching cross-sectional geometry) within a receptacle.

A receptacle may also be shaped to enable adjustment of an orientation of an electronic post positioned within the receptacle. By way of example, a fifth receptacle 162 may have a cross-sectional geometry that includes a circular section 164 combined with a triangular section 166. Such a cross-sectional geometry of the fifth receptacle 162 may be keyed to lock orientation of an electronic post having a matching cross-sectional geometry (e.g., having a corresponding circular section combined with a triangular section) within the fifth receptacle 162. In other words, the electronic post having a matching cross-sectional geometry as that of the fifth receptacle 162 may be oriented in a specific manner (e.g., to face a specific direction) while positioned within the fifth receptacle 162. For example, the fifth receptacle 162 (e.g., the triangular section 166) may block rotational movement of an electronic post having matching cross-sectional geometry while the electronic post having matching cross-sectional geometry is positioned within the fifth receptacle 162. However, another electronic post that has a different cross-sectional geometry, such as a circular geometry, may be positioned within the fifth receptacle 162 (e.g., at the circular section 164), and the fifth receptacle 162 may enable rotational movement of the electronic post that has a different cross-sectional geometry. In this way, the fifth receptacle 162 may enable adjustment of orientations of certain electronic posts, while blocking adjustment of orientations of other electronic posts. The orientation of the electronic posts may be adjusted manually and/or automatically (e.g., by the control system 82 instructing operation of an actuator). Another receptacle may be shaped to enable some adjustment of an orientation of an electronic post. For example, a sixth receptacle 168 may have a square cross-sectional geometry (e.g., similar to that of the third receptacle 150). Such a square cross-sectional geometry may enable adjustment of an electronic post (e.g., the third electronic post 148) positioned within the sixth receptacle 168 to particular orientations, such as orientations that are rotationally offset from one another by 90 degrees. In this manner, the sixth receptacle 168 may enable positioning of an electronic post in a limited quantity of specific orientations.

Each of FIGS. 4-8 described below illustrates a respective method or process associated with operation of the amusement park system 50, such as of an electronic post. In an embodiment, each of the methods may be performed by a single respective component or system, such as by the control system 82 (e.g., the processing circuitry 86). In an additional or alternative embodiment, multiple components or systems may perform the operations for a single one of the methods. It should also be noted that additional operations may be performed with respect to the described methods. Moreover, certain operations of the depicted methods may be removed, modified, and/or performed in a different order. Further still, the operations of any of the respective methods may be performed in parallel with one another, such as at the same time and/or in response to one another.

Figure 4:
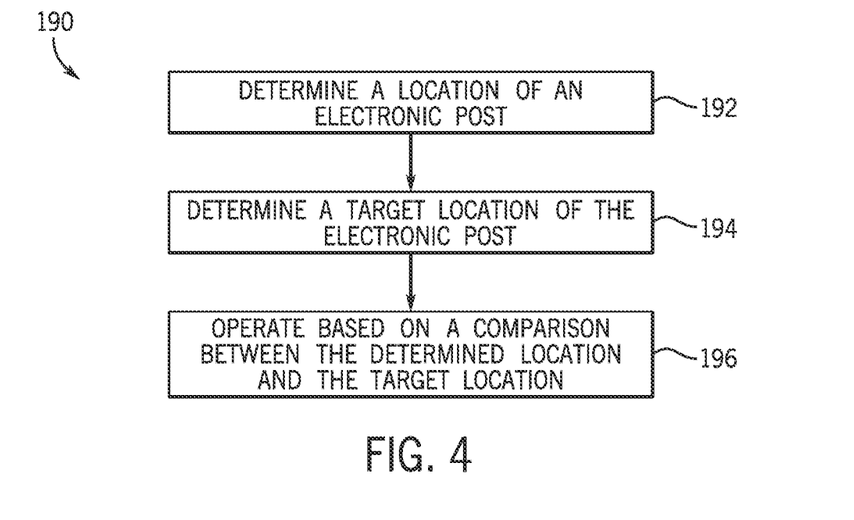
FIG. 4 is a flowchart of an embodiment of a method for operating based on a location of an electronic post, in accordance with an aspect of the present disclosure.

FIG. 4 is a flowchart of a method 190 for operating an electronic post (e.g., an electronic post positioned within a receptacle, an electronic post that is not positioned within any receptacle) based on a location of the electronic post. At block 192, a location of the electronic post is determined. For example, the location of the electronic post may be determined based on sensor data received from a sensor (e.g., the post sensor 78 of FIG. 1) of the electronic post. Additionally or alternatively, the location of the electronic post may be determined based on sensor data received from a different sensor (e.g., the interface sensor 90 of FIG. 1 detecting connection with an electronic post and an identifier associated with the electronic post). The determined location may indicate a receptacle in which the electronic post is inserted, a section of the amusement park where the electronic post is positioned, and the like. Additional information may also be communicated, such as a specific identifier of the electronic post, capabilities of the electronic post, characteristics of a receptacle that the electronic post is engaged with, and so forth.

At block 194, a target location of the electronic post is determined. In an embodiment, the target location may be determined based on preset data, such as data that associates the respective target locations of the electronic post with respective, corresponding times (e.g., a time of a day, a day of a week) or electronic post capabilities. In an additional or alternative embodiment, the target location may be determined based on a user input, which may include a request for the location of the electronic post. In a further embodiment, the target location may be determined based on another determined parameter, which may be received as sensor data. For instance, a target area to be blocked off may be determined (e.g., based on an indication that an event or operation, such as setup of show effects, is to occur at the target area), and the target location to be occupied by the electronic post may be determined based on the target area.

At block 196, an operation may be performed based on a comparison between the determined location and the target location. In an embodiment, in response to a mismatch between the determined location and the target location, the operation may be performed to urge adjustment of positioning of the electronic post to the target location. By way of example, the electronic post or other component (e.g., a component positioned within a receptacle corresponding to the target location) may be operated to indicate the mismatch between the determined location and the target location, such as by providing a notification (e.g., a visual output, an audio output, a tactile output). Additionally or alternatively, a communication may be transmitted to a device of a user. In either case, the operation being performed may indicate that the positioning of the electronic post is to be adjusted. An operation may also be performed in response to a match between the determined location and the target location. For example, another notification may be provided to indicate the match. The notification may indicate that the electronic post is to be maintained at the target location. Thus, the operation being performed may facilitate desirable positioning of the electronic post.

Figure 5:
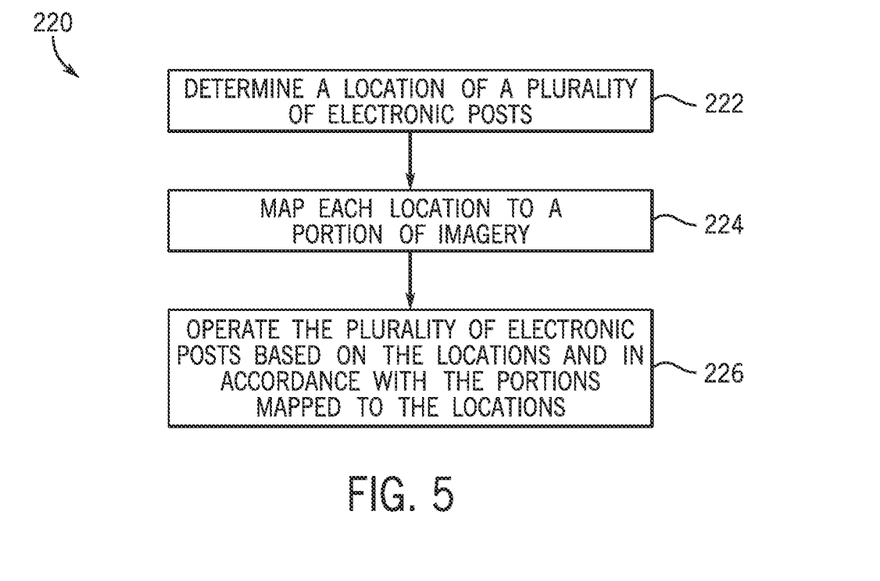
FIG. 5 is a flowchart of an embodiment of a method for operating multiple electronic posts, in accordance with an aspect of the present disclosure.

FIG. 5 is a flowchart of an embodiment of a method 220 for operating multiple electronic posts. For example, the method 220 may be performed to provide imagery via operation of the electronic posts. At block 222, the location of each electronic post of a plurality of electronic posts may be determined. For example, each electronic post may be positioned within a respective receptacle, and the location of each electronic post may be determined based on their detected or communicative coupling within the receptacles (e.g., via the post sensor 78 of FIG. 1 positioned at the electronic post, via the interface sensors 90 of FIG. 1 positioned within the receptacles).

At block 224, each location may be mapped to a portion of imagery. For example, mapping of the locations to pixels of the imagery may be used to provide cumulative appearance of the imagery via the electronic posts. In an embodiment, each pixel may be associated with a particular color. In an additional or alternative embodiment, each pixel may be associated with an image of a portion of the imagery.

At block 226, the plurality of electronic posts may be operated based on the locations of the electronic posts and in accordance with the portions mapped to the locations. As an example, each electronic post may be operated to emit a color associated with the pixel mapped to the electronic post. As another example, each electronic post may be operated to emit the image of the portion of the imagery associated with the pixel mapped to the electronic post. Such operation of the electronic posts based on their locations and in accordance with the mapped pixels may cause the electronic posts to collectively provide an appearance of the imagery. For instance, a guest viewing the electronic posts from afar (e.g., at a particular height above the electronic posts) may see an appearance of the imagery from viewing of the electronic posts. It should be noted that each post may provide more than a single pixel depending on lighting capabilities associated therewith.

The method 220 may be repeatedly performed in an embodiment. For example, the imagery being provided by the electronic posts may be adjusted by causing different pixels to be mapped to the locations and adjusting operation of the electronic posts accordingly. In this way, the imagery being produced via the electronic posts may be adjusted, such as by providing an animation or an appearance of moving imagery or different image frames (e.g., a character moving through a space collectively occupied by the electronic posts).

A method similar to the method 220 may also be performed to operate the electronic posts based on their locations to provide a different mapped operation. That is, each location may be mapped to another operation, and the electronic posts may be controlled in accordance with such an operation based on their locations. For example, the electronic posts may be configured to output imagery to guide navigation by the guests along a path. As another example, the electronic posts may be operated to output audio effects or other effects based on such effects being mapped to each location (e.g., to cause the electronic posts to provide a collection of audio effects, such as environmental sounds, an orchestral symphony) to entertain the guests. Other operations of the electronic posts based on their locations and mapped operations may include movement (e.g., physical movement of a component coupled to an electronic post), fluid output, and so forth.

Figure 6:
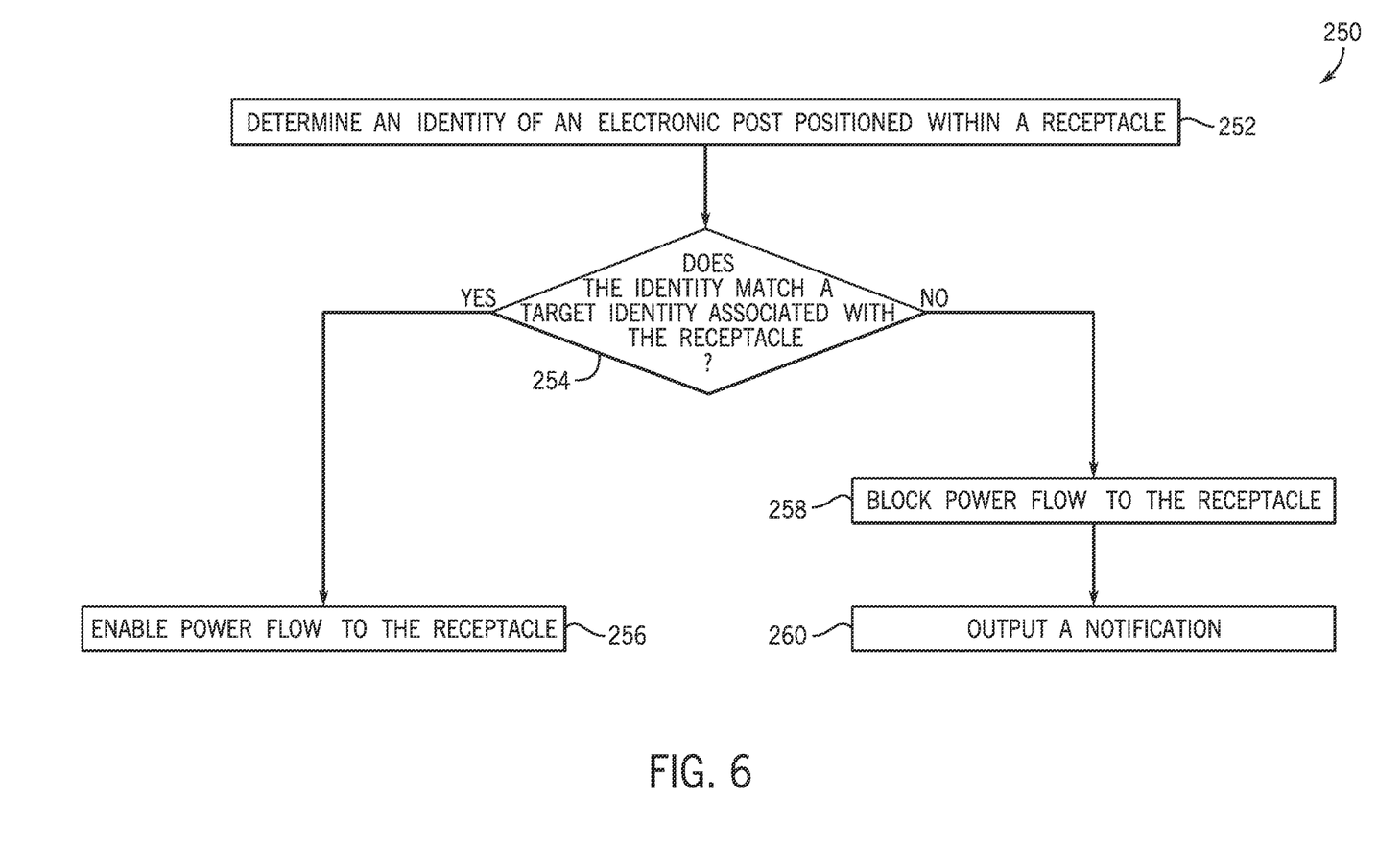
FIG. 6 is a flowchart of an embodiment of a method for controlling power flow to an electronic post, in accordance with an aspect of the present disclosure.

FIG. 6 is a flowchart of an embodiment of a method 250 for controlling power flow to an electronic post. At block 252, an identity of an electronic post positioned within a receptacle is determined. For example, the identity may be determined via a sensor, such as the interface sensor 90 of FIG. 1. In an embodiment, the sensor may include an optical sensor (e.g., a reader, a scanner, a color sensor) configured to acquire image data. The electronic post may include a physical marker (e.g., a barcode, a quick response code, a colored marker) that may be detected by the optical sensor, and the identity of the electronic post may be determined based on the reading by the optical sensor. In an additional or alternative embodiment, the sensor may be configured to determine a capacitance associated with the electronic post. In a further embodiment, the sensor may include a receiver configured to receive data transmitted (e.g., wirelessly transmitted) by the electronic post. For any of such embodiments, the sensor may transmit sensor data indicative of the parameter determined by the sensor, and an identity of the electronic post may be determined based on the sensor data. In one embodiment, the identity of the electronic post may indicate certain additional information, such as a type of the electronic post, an operating mode of the electronic post, whether the electronic post is in operation, modules installed in the electronic post, and so forth.

At block 254, the determined identity of the electronic post may be compared to a target identity associated with the receptacle to determine whether the determined identity matches the target identity. For example, the target identity may indicate a particular electronic post or type of electronic post that may be desirable for positioning in the receptacle (e.g., to provide a desirable operation at the area occupied by the receptacle). In an embodiment, the target identity may be automatically associated with the receptacle, such as based on preset data or sensor data. In an additional or alternative embodiment, the target identity may be determined via a user input.

At block 256, in response to determining that the identity of the electronic post matches the target identity, thereby indicating that a desirable electronic post or type of electronic post may positioned within the receptacle, power flow to the receptacle may be enabled. Such power flow may enable operation of the electronic post, such as to provide power to a component of or coupled to the electronic post. For example, with reference to FIG. 1, the power flow may be enabled by controlling the power source 64 to direct power toward the interface 66 and/or by operating the switch 88 to enable flow of power from the power source 64 to the interface 66.

At block 258, in response to determining that the identity of the electronic post does not match the target identity, thereby indicating that an electronic post or other object may be undesirably positioned within the receptacle, power flow to the receptacle may be blocked. Thus, the object positioned within the receptacle may not receive power and therefore may not operate. As such, undesirable consumption of power (e.g., power that would otherwise be used to enable an undesirable object to operate) may be avoided. For instance, with reference to FIG. 1, the power may be blocked by suspending operation of the power source 64 to block flow of power toward the interface 66 and/or by operating the switch 88 to interrupt the flow of power from the power source 64 to the interface 66. At block 260, a notification may additionally or alternatively be output in response to determining that the identity of the electronic post does not match the target identity. The notification may include a visual output, an audio output, and/or a communication transmitted to an electronic device. Such a notification may inform a user that an undesirable object may be positioned within the receptacle, thereby prompting the user to inspect the receptacle, remove the undesirable object from the receptacle, and/or position a desirable electronic post within the receptacle.

The method 250 may also be performed based on the target identity including no identity. That is, the target identity including no identity may indicate that no electronic post is to be positioned within the receptacle and that power flow to such a receptacle may be blocked. In such an embodiment, in response to determining an electronic post is positioned within the receptacle (e.g., based on a determined identity), the notification may be output. In an embodiment, a target identity is associated with the receptacle, but no identity of an electronic post positioned within the receptacle may be determined. Such a determination may indicate that an unidentifiable object is positioned within the receptacle. Additionally or alternatively, the determination may indicate that no object is positioned within the receptacle, such as that an electronic post was undesirably removed from the receptacle and/or that a desired electronic post has yet to be positioned within the receptacle. In response, power flow to the receptacle may be blocked and/or a notification may be output.

Figure 7:
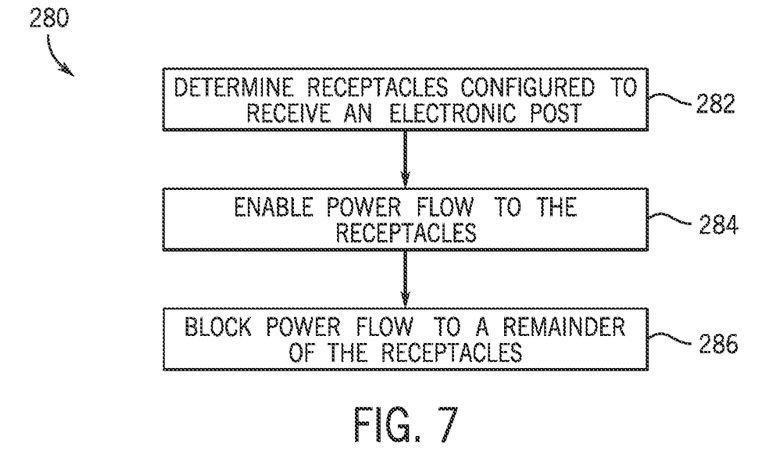
FIG. 7 is a flowchart of an embodiment of a method for controlling power flow to a receptacle in which an electronic post may be inserted, in accordance with an aspect of the present disclosure.

FIG. 7 is a flowchart of an embodiment of a method 280 for controlling power flow to a receptacle. At block 282, receptacles configured to receive an electronic post at a particular interval of time may be determined. Such receptacles may be determined based on predetermined data, such as data that associates the receptacles to various parameters (e.g., time) indicated by sensor data. At block 284, power flow to such receptacles may be enabled, such as by controlling the power source 64 and/or the switch 88 of FIG. 1. At block 286, power flow to a remainder of receptacles that are not configured to receive an electronic post at the particular interval of time may be blocked. In this manner, power flow to certain receptacles may be readily enabled or readily blocked (e.g., without having to initially determine an identity of an electronic post positioned within the receptacles).

Figure 8:
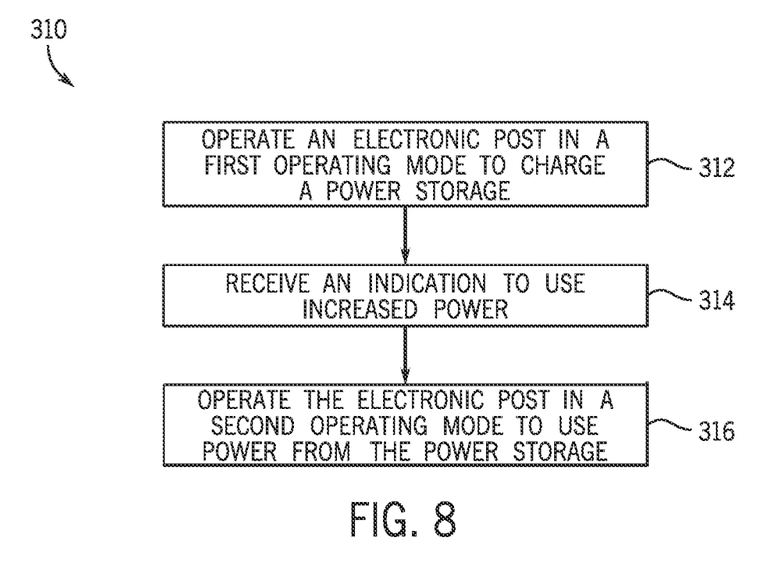
FIG. 8 is a flowchart of an embodiment of a method for operating an electronic post, in accordance with an aspect of the present disclosure.

FIG. 8 is a flowchart of an embodiment of a method 310 for operating an electronic post. At block 312, the electronic post may be operated in a first operating mode to charge and store power in a power storage (e.g., the power storage 70 of FIG. 1). For example, power wirelessly transmitted to the electronic post may be stored in the power storage in the first operating mode.

At block 314, an indication to use increased power may be received. For instance, the electronic post may be electrically coupled to a component (e.g., a component that is not a part of the electronic post), such as a display screen, a ride vehicle, a show effect device, and the like. The indication may include a particular operation of the component in which increased power may be consumed, such as to present a particular display, to provide a particular light effect, or to output an audio effect. For example, the indication may be received as sensor data, such as sensor data that includes a time, a position of an object (e.g., of a guest or a ride vehicle), a user interaction, an operational adjustment, another suitable parameter, or any combination thereof.

At block 316, the electronic post may be operated in a second operating mode to use power from the power storage in response to receiving the indication. That is, the power storage may discharge the power to enable usage of the increased power. For example, the power may be discharged to the component electrically coupled to the electronic post. In an embodiment, the component may not regularly consume increased power. Thus, manufacture or configuration of the component to be capable of consuming increased power (e.g., via an internal power source) without an external power source may not be desirable. Instead, the power storage of the electronic post may be used as an auxiliary power source to be able to provide additional power to the component. In this way, even though increased power may not be consumed at a regular or frequent basis, increased power may be readily provided by the power storage, as prompted by the indication. As such, the electronic post may be used to provide increased power in any suitable implementation, such as without having to reconfigure or otherwise adjust operation of a component to enable consumption of increased power (e.g., absent the power provided by the electronic post).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park system, comprising:
   an electronic post configured to be positioned within a receptacle of a base of the amusement park system, wherein the electronic post is configured to receive power directed to the receptacle; and
   a control system configured to perform operations comprising:
      determining a location of the electronic post; and
      instructing operation based on the location.

2. The amusement park system of claim 1, wherein the control system is configured to perform operations comprising:
   determining a target location of the electronic post; and
   instructing the electronic post to provide a visual output, an audio output, or both in response to determining the location of the electronic post matches the target location.

3. The amusement park system of claim 1, wherein the control system is configured to at least:
   map a portion of imagery to the location of the electronic post; and
   instruct the electronic post to output a light based on the location of the electronic post and in accordance with the portion of the imagery.

4. The amusement park system of claim 1, wherein the power comprises electric power, optical fiber, or both.

5. The amusement park system of claim 1, comprising a light emitter disposed within the receptacle, wherein the control system is configured to at least:
   determine the electronic post is to be positioned within the receptacle;
   instruct the electronic post to output a first light; and
   instruct the light emitter to output a second light corresponding to the first light out of the receptacle in response to determining the electronic post is to be positioned within the receptacle.

6. The amusement park system of claim 1, wherein the electronic post comprises a sensor, the control system is communicatively coupled to the sensor, and the control system is configured to receive sensor data from the sensor and determine the location of the electronic post based on the sensor data.

7. The amusement park system of claim 1, wherein the control system is configured to instruct adjustment of the power directed to the receptacle to adjust operation of the electronic post using the power directed to the receptacle.

8. An amusement park system, comprising:
   an electronic post configured to be positioned within a receptacle of a base of the amusement park system;
   an interface positioned within the receptacle and configured to receive power, wherein the interface is configured to wirelessly transfer received power to the electronic post; and
   a control system configured to instruct adjustment of flow of the power to the interface to adjust wireless transfer of the received power from the interface to the electronic post, thereby adjusting operation of the electronic post using the received power.

9. The amusement park system of claim 8, wherein the interface is configured to produce a magnetic field via the power to induce a current flow through the electronic post to wirelessly transfer the received power from the interface to the electronic post.

10. The amusement park system of claim 8, wherein the control system is configured to at least:
    determine an identification of the electronic post positioned within the receptacle;
    enable flow of the received power to the receptacle in response to determining the identification of the electronic post matches a target identity associated with the receptacle; and
    block the flow of the received power to the receptacle in response to determining the identification of the electronic post does not match the target identity.

11. The amusement park system of claim 10, comprising a sensor communicatively coupled to the control system, wherein the control system is configured to determine the identification of the electronic post based on sensor data received from the sensor.

12. The amusement park system of claim 8, comprising a plurality of electronic posts comprising the electronic post and comprising a plurality of receptacles comprising the receptacle.

13. The amusement park system of claim 8, wherein the control system is configured to at least:
    determine the receptacle is to receive the electronic post; and
    instruct the enablement of the flow of the power to the receptacle in response to determining the receptacle is to receive the electronic post.

14. The amusement park system of claim 8, wherein the electronic post comprises a power storage configured to store the received power wirelessly transferred from the interface, and the control system is configured to at least:
    instruct the electronic post to operate in a first operating mode to store the received power wirelessly transferred from the interface;
    receive an indication of increased power usage by a component coupled to the electronic post; and
    instruct the electronic post to operate in a second operating mode to discharge the received power from the power storage to the component in response to receiving the indication of the increased power usage by the component.

15. The amusement park system of claim 8, comprising the base and a cover coupled to the base, wherein:
    the cover is configured to transition between a first position and a second position,
    the cover occludes the receptacle of the base in the first position, and
    the cover exposes the receptacle in the second position to enable positioning of the electronic post within the receptacle.

16. An electronic post for an amusement park system, the electronic post comprising:
    an extension configured to be positioned within a receptacle of a base of the amusement park system; and
    a sensor configured to receive power wirelessly transferred from an interface disposed within the receptacle, wherein the sensor is configured to transmit sensor data indicative of a parameter associated with the electronic post.

17. The electronic post of claim 16, wherein the sensor is configured to detect receipt of a light, and the electronic post comprises a control system configured to perform operations comprising:
    receiving the sensor data from the sensor, wherein the sensor data is indicative of the receipt of the light;
    determining an interruption of the light received by the sensor based on the sensor data; and instructing the electronic post to provide a visual output, an audio output, or both in response to determining the interruption of the light.

18. The electronic post of claim 17, wherein the electronic post is configured direct the light to at least one additional electronic post for the amusement park system.

19. The electronic post of claim 16, wherein a cross-sectional area of the extension corresponds with a cross-sectional area of the receptacle of the base of the amusement park system to block rotation of the extension within the receptacle.

20. The electronic post of claim 16, comprising an additional extension configured to be positioned within an additional receptacle of the base of the amusement park system, wherein the sensor is configured to receive additional power wirelessly transferred from an additional interface disposed within the additional receptacle.

* * * * *